Sept. 5, 1961
D. J. BURKE
2,999,124
ELECTRIC JUMPER BOND
Filed Sept. 26, 1958
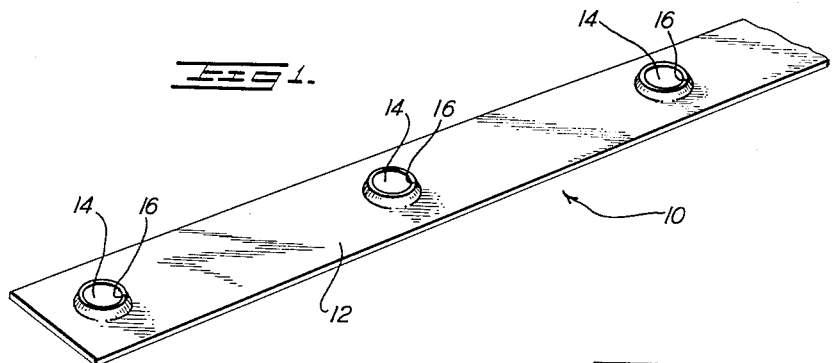
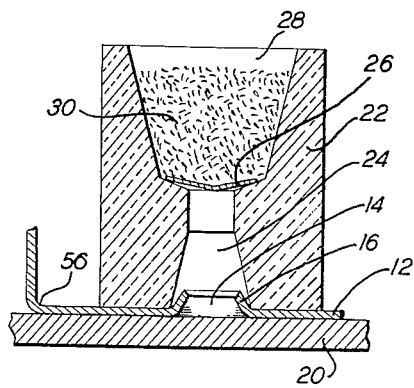
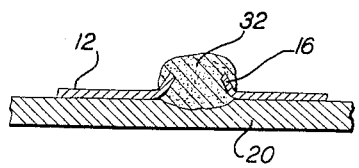
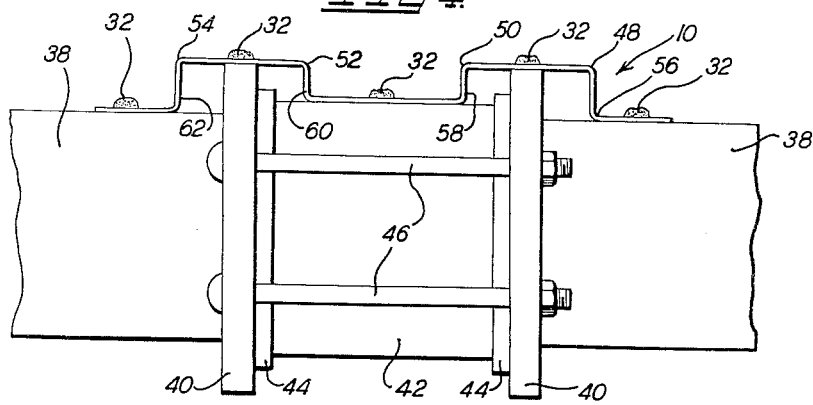
INVENTOR.
Donald J. Burke
BY Albert H. Kirchner
ATTORNEY

United States Patent Office 2,999,124
Patented Sept. 5, 1961

2,999,124
ELECTRIC JUMPER BOND
Donald J. Burke, Tulsa, Okla., assignor to Continental Industries, Incorporated, Tulsa, Okla., a corporation of Oklahoma
Filed Sept. 26, 1958, Ser. No. 763,588
3 Claims. (Cl. 174—84)

This invention relates to electrical connectors and more particularly to an improved jumper adapted to be bonded to the parts to be connected by means of welding.

Conventional connectors for electrically connecting railroad track rails to insure passage of propulsion or signal currents are varying lengths of stranded cable of different diameters. These are terminated by metal sleeves which may be welded to the cable. Stranded cable is expensive to manufacture and difficult to satisfactorily connect to a conductive body such as a rail. Each different size cable and sleeve assembly requires a different mold for reception of the molten weld metal to be fused to the sleeve and the rail. The charge of thermite welding mix must also be varied in size. Different molds are required for welding the cable to a horizontal surface, a vertical surface, a ground rod or a lug. The cable terminals usually require flattening to increase surface contact with the rail. Such flattening is performed in different size hammer dies. Frequently two or more cables must be electrically joined to the rail at or near the weld point. This is normally accomplished by terminating the cables in sleeves of Y, X and T shapes. These sleeves, in turn, require different molds for welding to the rail. It is therefore apparent that the provision of adequate connections between rails or other bodies for similar purposes requires a wide variety of parts and apparatus plus considerable skill in their proper use.

It is a primary object of this invention to simplify the above-described bonding techniques, problems and apparatus by providing an improved connector which may be standardized in a single or limited number of sizes, and which may be easily and quickly bonded to rails, pipes and the like with a minimum of welding equipment.

Another object of the invention is to provide a strap connector with punched openings having walls that extend beyond the strap surface in lips which interlock with the molten weld metal, thereby strengthening the bond between the strap and the parts to which it is connected.

A further object of the invention is to provide a strap connector which may be bonded to metal parts by use of smaller charges of copper-thermite welding compositions than those ordinarily needed to bond equivalent sized connectors currently in use.

Still another object of the invention is to provide a strap or ribbon jumper with flared weld openings punched therein, the jumper being readily weldable to a second jumper or additional jumpers of similar shape and size to form a laminated conductor suitable for carrying heavier currents.

A further object of the invention is to provide strap connectors each having a series of flared weld holes, certain of which may be nested for welding the connectors to each other in the form of X, L, T and other shaped junctions.

Another object of the invention is to provide a strap or ribbon jumper which may be supplied in long lengths wound on a coil form from which, for accomplishment of any particular connection, it may be partially unwound and cut to a suitable length.

Yet another object of the invention is to provide a jumper which may be manufactured cheaply and applied inexpensively, since only a limited number of different welding crucibles or molds are necessary to bond the jumper in a wide range of applications.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIGURE 1 is a perspective view of a jumper constructed in accordance with the invention;

FIG. 2 is a fragmentary vertical section showing a welding mold applied to one of the openings in the jumper of FIG. 1 for welding the jumper to the horizontal surface of another electrically conductive body;

FIG. 3 is a vertical section of the welded junction obtained after solidification of the weld metal; and FIG. 4 is an elevational view of the jumper of FIG. 1 connected to sections of a pipe.

Referring now to the drawings, FIG. 1 shows a preferred embodiment of the invention which comprises a thin, elongated, flexible strap generally indicated by the reference numeral 10. The jumper 10 is preferably made in the form of a continuous ribbon 12 of copper or other suitable electrically conductive metal. A series of lengthwise aligned and equally spaced openings 14 are provided in the strap 12. The wall 16 of each opening 14 extends a short distance beyond one surface of the strap 12 and is preferably frustro-conical in shape for reasons to be later described. Thus, each opening 14 is defined by a flared wall or lip 16 constituting an embossment punched or otherwise formed in the strap and having an outer edge substantially parallel with the strap surface. The strap 10 may be supplied in coils several hundred feet in length with the flared welding holes 14 pre-punched at desired intervals. In such case, different jumper lengths to fit the job may be cut from the coil on job locations. If desired, the welding holes may be omitted from the coil and punched into the strap with a simple hand tool at the optimum points as determined on the job.

In bonding the strap 12 to a horizontally disposed surface of a conducting body 20, the strap is placed on the body in the desired position with the embossments 16 extending in a direction away from the body, as shown in FIG. 2. Conventional copper-thermite type molding apparatus slightly modified may then be used for formation of a weld. Such apparatus is partially shown in FIG. 2 as comprising a mold 22 provided with a conical opening 24 which is seated over a jumper opening 14 centered by the embossment 16. Mold 22 has a conventional crucible portion 28 in which is placed the welding charge 30, normally comprising a mixture of copper oxide and aluminum as the reducing agent. An ignitible powder, not shown, surmounts the charge 30. Upon firing of the igniter powder, a violent exothermic reaction takes place in the mix 30 and produces molten copper which melts the metal gate 26 and flows through the mold openings 24 into the jumper opening 14 and over the top of the embossment 16. The copper fuses to that portion of the body 20 which lies under the opening 14 as well as to the inner and outer surfaces of the embossment. Upon solidification of the weld metal and removal of the mold 22, a good weld or bond 32, FIG. 3, remains. This bond is strengthened by the interlocking relation of the embossment 16 with the metal of the weld 32. Since the weld 32 is confined within the lateral dimensions of the strap 10 by application to an opening 14, a much smaller charge is needed than the conventional charge applied over the outer dimensions of a conventional jumper.

FIG. 4 illustrates the application of the improved jumper of FIG. 1 to electrically connect sections of a metal pipe for its cathodic protection. In the illustration, a pair of similar pipe sections 38 having end flanges 40 are physically coupled to a spacer pipe section 42 having smaller flanges 44 by means of tie bolts 46 drawing the flanges 40 together. The jumper 10, being flexible, is appropriately shaped with the right angle bends indicated at 48, 50, 52, 54, 56, 58, 60 and 62 to conform with the different diameters at the pipe coupling. A number of welds 32 are then formed in the appropriate jumper openings 14 to physically and electrically bond the jumper 10 to each of the pipe sections 38, 42 and flanges 40.

The strap connector 10 may be pre-cut and marketed in lengths suitable for normal jumper distances. A preferred size of the jumper is 1/16" thick by 1 1/4" wide having 1/2" diameter openings 14 spaced apart on 3" centers. This size jumper is equivalent in electric current carrying capacity to 7-strand No. 1/0 AWG cable. However, the amount of charge required to make one weld 32 on the improved connector is only half the amount of charge required to weld a cable terminal of equivalent size. Where more current carrying capacity is required, two or more straps 10 may be laid upon each other and welded together with the superposed lips 16 in nesting relation. Each weld will then interlock with a set of openings 14 and embossments 16 as well as fuse to the body to be connected. In this manner, two or more jumpers 10 may be joined to make a laminated strap in which the individual jumpers carry current in parallel.

If two jumpers must be connected to each other at or near the point of connection to a rail or other body, the jumpers may be welded together by nesting a pair of embossments 16 as described. The jumpers need not, however, be sandwiched together in lengthwise parallelism. They may cross each other at right or other angles, may form a T connection, or a Y connection. In this way a pair of jumpers may be connected in a manner equivalent to the X, T and Y sleeves on cable jumpers. Only one welding mold, however, is required for these different types of connections with the jumper of this invention.

When the jumper 10 is welded to a vertical surface rather than a horizontal one, a different mold will be required. Thus, a standard size jumper 10 with two molds and one standard size welding charge may be used in most applications in replacement of the many different sizes and shapes of conventional cable jumpers, cable terminal sleeves, hammer dies, and molds. Where a jumper of much higher current capacity is needed, as in grounding power generating stations, a larger size jumper would be desirable. For this use, the size could be increased to 1/16" thick by 4" wide with pre-punched holes 1" diameter or larger on 1' centers. Such a jumper would be equivalent to a 7-strand No. 4/0 AWG cable now in use. The larger jumper could be welded to the generator station structure, to itself (T-taps), and to ground lugs in the manner described above for jumper 10. A larger welding charge and larger horizontal and vertical molds would be required for this second and larger standard jumper.

It will be apparent that the connector described above is suitable for use in a wide variety of applications. Examples of such uses are the connecting of railway and crane rails and feeders, the connecting of pipe sections, grounding of power generating station, substations, steel mills, etc. Many advantages will accrue from its use in place of conventional connectors. As outlined above, these advantages include simplification, reduction of skill required to make the welds, reduction in the number of sizes of jumpers and in the types of welding molds and auxiliary apparatus needed, reduction in the size of welding charge, and reduction in the overall cost resulting from these factors combined.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. An electrical connection comprising a conductive body, a strip of conductive material positioned against a surface of said body and having a wall integral with the strip protruding beyond that surface of the strip opposite to said conductive body and surrounding an opening in the strip so as to form a perforated embossment, and solidified weld metal filling said embossment and welded at its bottom directly to the body and at its sides directly to the inside of said embossment.

2. An electrical connection as claimed in claim 1, in which the strip is formed of copper and the solidified weld metal is a copper-thermite composition.

3. An electrical connection comprising a conductive body, a strip of conductive material positioned against a surface of said body and having an integral embossment protruding beyond that surface of the strip opposite to said conductive body, said embossment being of substantially frusto-conical shape and having an axial perforation therein, and solidified weld metal filling said embossment and overlying the rim thereof and being welded at its bottom directly to the conductive body and in its upper portions directly to the inside, rim and outside of the embossment whereby the strip is interlocked to the body.

References Cited in the file of this patent

UNITED STATES PATENTS

| | | |
|---|---|---|
| 232,561 | Smith | Sept. 21, 1880 |
| 1,990,718 | Swanstrom | Feb. 12, 1935 |
| 2,084,298 | Secrist | June 15, 1937 |
| 2,250,280 | Starbird | July 27, 1941 |
| 2,888,742 | Stumbock | June 2, 1959 |

FOREIGN PATENTS

| | | |
|---|---|---|
| 534,783 | Great Britain | Mar. 18, 1941 |